US009426664B2

(12) United States Patent
Hong et al.

(10) Patent No.: US 9,426,664 B2
(45) Date of Patent: Aug. 23, 2016

(54) CONTROL MECHANISM FOR COMMUNICATION VIA DIFFERENT FREQUENCY BANDS

(75) Inventors: Wei Hong, Beijing (CN); Wei Bai, Beijing (CN); Jing Han, Beijing (CN); Erlin Zeng, Beijing (CN); Haiming Wang, Beijing (CN); Na Wei, Beijing (CN); Chunyan Gao, Beijing (CN); Pengfei Sun, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 46 days.

(21) Appl. No.: 14/375,857

(22) PCT Filed: Feb. 8, 2012

(86) PCT No.: PCT/CN2012/070963
§ 371 (c)(1),
(2), (4) Date: Jul. 31, 2014

(87) PCT Pub. No.: WO2013/116998
PCT Pub. Date: Aug. 15, 2013

(65) Prior Publication Data
US 2014/0376483 A1     Dec. 25, 2014

(51) Int. Cl.
*H04Q 7/00* (2006.01)
*H04W 16/14* (2009.01)
*H04W 72/04* (2009.01)
*H04L 1/08* (2006.01)
*H04W 74/08* (2009.01)
*H04W 88/06* (2009.01)
*H04W 88/10* (2009.01)
*H04W 28/08* (2009.01)

(52) U.S. Cl.
CPC ............ *H04W 16/14* (2013.01); *H04W 72/048* (2013.01); *H04L 1/08* (2013.01); *H04W 28/085* (2013.01); *H04W 74/08* (2013.01); *H04W 88/06* (2013.01); *H04W 88/10* (2013.01)

(58) Field of Classification Search
None
See application file for complete search history.

(56) References Cited

U.S. PATENT DOCUMENTS

2011/0143674 A1* 6/2011 Lim ..................... H04W 72/082
455/63.1
2012/0039284 A1* 2/2012 Barbieri ................ H04W 48/10
370/329

(Continued)

FOREIGN PATENT DOCUMENTS

CN     102118841     7/2011
WO   2011147363    12/2011

*Primary Examiner* — Duc C Ho
(74) *Attorney, Agent, or Firm* — Oblon, McClelland, Maier & Neustadt, L.L.P.

(57) ABSTRACT

There is provided a mechanism for controlling communications conducted via different frequency bands or communication spectrums. When a communication via a first communication path, for example an unlicensed or white space communication spectrum, is to be established, e.g. for offloading traffic from a second communication path, for example a licensed cellular communication spectrum, a preamble transmission command is generated and transmitted from a communication network control element, such as an eNB, via the second communication path to a communication element, such as a UE. By means of the preamble transmission command, the transmission of a preamble signal by the receiving communication element on the first communication path with predetermined communication resources is triggered. Based on a receipt or non-receipt of the preamble signal via the first communication path, the communication network control element is able to determine that the communication element can establish a connection on the first communication path, for example the unlicensed or white space communication spectrum.

18 Claims, 7 Drawing Sheets

(56) References Cited

U.S. PATENT DOCUMENTS

| | | | |
|---|---|---|---|
| 2012/0071186 A1 | 3/2012 | He et al. | |
| 2013/0294427 A1* | 11/2013 | Kim | H04W 16/14 370/338 |
| 2015/0057011 A1* | 2/2015 | Di Girolamo | H04W 16/14 455/454 |
| 2015/0304853 A1* | 10/2015 | Murray | H04W 72/0426 455/454 |

* cited by examiner

Fig. 1

| Oct 1 | CC index | Subframe pattern |
|---|---|---|
| Oct 2 | Subframe pattern | Frequency offset |
| Oct 3 | Fre. offset | Preamble ID |
| Oct 4 | Power level | Repeat |

CONTROL MECHANISM FOR COMMUNICATION VIA DIFFERENT FREQUENCY BANDS

BACKGROUND OF THE INVENTION

Field of the Invention

The present invention relates to a mechanism for controlling communications conducted via different frequency bands or communication spectrums. In particular, the present invention is directed to apparatuses, methods and computer program products providing a control mechanism by means of which communications to be conducted via for example an unlicensed or white space communication spectrum can be configured or controlled for offloading traffic from a licensed communication spectrum, for example.

The following meanings for the abbreviations used in this specification apply:
BS: base station
CA: carrier aggregation
CC: component carrier
CCCH: common control channel
CE: control element
CPU: central processing unit
CSI: channel state information
DL: downlink
DL-SCH: downlink shared channel
DRX: discontinuous reception
eNB: evolved node B
FDD: frequency division multiplex
ID: identification
ISM: industrial, scientific, medical
LCID: logical channel identification
LTE: Long Term Evolution
LTE-A: LTE Advanced
MAC: media access control
PCell: primary serving cell
PDCCH: physical downlink control channel
PL: pathloss
RAT: radio access technology
RRC: radio resource control
SCell: secondary serving cell
TDD: time division multiplex
TV: television
UE: user equipment
UL: uplink
USB: universal serial bus
WLAN: wireless local access network
WS: white space In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WIMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between communication elements such as a UE and another communication element or UE, a database, a server, etc., one or more intermediate network elements such as communication network control elements, support nodes or service nodes are involved which may belong to different communication networks.

Newly developed communication systems, such as those based on 3GPP LTE or LTE-A aim to provide significantly enhanced services for users, for example by means of higher data rates and lower latency, with reduced cost. In order to improve, for example, data rates achievable in the communication system, methods like CA or the like are considered is one of key technologies to greatly improve the data rate. CA may be implemented in different modes, for example as intra band CA where two or more carriers in one frequency band are used, or inter-band CA where two or more different and separated carriers on different frequency bands are used. In 3GPP LTE communication systems of release 10, for example, CA of either FDD-FDD system or TDD-TDD system on the licensed LTE frequency bands is discussed.

In order to increase the available bandwidth for communications, it is currently under development to use frequency bands or communication spectra besides the licensed (LTE or the like) spectrum allocated to the communication network. For example, utilization of communication resources of an unlicensed band such as ISM bands, or of communication resources of frequency bands reserved for e.g. television or military services for a certain time or in a certain place (referred to as white space) is considered as supplements to the resources provided by the licensed LTE band, or the like. The available unlicensed band can be different from geographical locations around the world. Examples of unlicensed communication spectrum is the 2.4 GHz ISM band with a bandwidth of 83.5 MHz, the 5 GHz unlicensed band with a bandwidth larger than 100 MHz, while an available WS spectrum is provided, for example, by unused parts of a TV spectrum in the 54-698 MHz range.

By means of utilizing these additional resources, at least temporarily, it becomes possible, for example, that an operator gets an opportunity to offload traffic from expensive or heavy loaded licensed LTE band to (possibly) zero-cost unlicensed band, when necessary. In other words, by using unlicensed band and licensed band CA, it is possible, for example, that traffic load can be balanced, when necessary, that a peak data rate is improved, i.e. that the spectrum efficiency in general is improved for a network operator.

However, due to the different natures of communication on licensed spectrum and communication on unlicensed spectrum, several problems are to be solved before an efficient and reliant usage of communication resources on an unlicensed or WS spectrum is possible in connection with a communication on the licensed spectrum, i.e. a communication controlled by a communication network control element such as an eNB. For example one of these problem arises from the fact that communication resources on unlicensed bands are "shared". For example, in the ISM band, there may be transmissions of WiFi systems (e.g. according to IEEE 802.11a/b/g/n/ac, etc.), as well as Bluetooth, ZigBee, wirelessUSB, cordless phone, microwave etc. On the other hand, with regard to WS resources, there may be other systems which are also trying to use those resources. Therefore, corresponding control mechanisms are required which allow an efficient usage and minimize interference, for example an irregular ON/OFF mechanism which allows a communication network control element, such as an eNB, to turn off the whole system from time to time so as to control interference or to give other systems also the chance to transmit on the unlicensed resources.

SUMMARY OF THE INVENTION

Examples of embodiments of the invention provide an apparatus, method and computer program product by means of which communications conducted via different frequency bands or communication spectrums can be controlled in an improved. In particular, the present invention is directed to apparatuses, methods and computer program products providing a control mechanism by means of which communications to be conducted via for example an unlicensed or WS communication spectrum can be configured or controlled for offloading traffic from a licensed or another unlicensed communication spectrum already used, for example from LTE based communications or working WLAN communications, or the like.

This is achieved by the measures defined in the attached claims.

According to an example of an embodiment of the proposed solution, there is provided, for example, an apparatus comprising a preamble transmission command processing portion configured to generate a preamble transmission command comprising instruction for causing transmission of a preamble signal on a first communication path, and to cause transmission of the preamble transmission command on a second communication path being different to the first communication path, and a preamble signal detecting portion configured to detect whether the preamble signal instructed by the preamble transmission command is received via the first communication path.

Furthermore, according to an example of an embodiment of the proposed solution, there is provided, for example, a method comprising generating a preamble transmission command comprising instruction for causing transmission of a preamble signal on a first communication path, transmitting the preamble transmission command on a second communication path being different to the first communication path, and detecting whether the preamble signal instructed by the preamble transmission command is received via the first communication path.

In addition, according to an example of an embodiment of the proposed solution, there is provided, for example, an apparatus comprising a preamble transmission command receiving portion configured to receive and process a preamble transmission command comprising instruction for causing transmission of a preamble signal on a first communication path, wherein the preamble transmission command is received via a second communication path being different to the first communication path, and a preamble signal transmitting portion configured to cause transmitting of a preamble signal via the first communication path according to the instruction of the preamble transmission command.

Furthermore, according to an example of an embodiment of the proposed solution, there is provided, for example, a method comprising receiving and processing a preamble transmission command comprising instruction for causing transmission of a preamble signal on a first communication path, wherein the preamble transmission command is received via a second communication path being different to the first communication path, and transmitting a preamble signal via the first communication path according to the instruction of the preamble transmission command.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide an apparatus, method and computer program product by means of which communications conducted via different spectra and in multiple different frequency bands can be configured and controlled in such a manner that a communication connection control element is able to estimate the possibilities for e.g. offloading traffic from a licensed communication spectrum to an unlicensed or WS communication spectrum in a more accurate and efficient manner since the actual coverage on the unlicensed or WS spectrum can be determined accurately and efficiently. Furthermore, it is possible to gain information about communication properties, such as an UL pathloss, in a more accurate manner and to provide corresponding information to the communication parties in an efficient way.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples and embodiments will be described in connection with a cellular communication network based on a 3GPP LTE or LTE-A system which communicates via a specified communication path in the licensed LTE or LTE-A spectrum, wherein at least one further communication path is provided with which the eNB and a UE can conduct a communication, such as on an ISM spectrum or WS spectrum. However, it is to be noted that the present invention is not limited to an application using such types of communication paths, but is also applicable in other types or combinations of communication systems and the like, as long as both the communication network control element and the communication element are able to communicate on these communication paths or spectra.

A basic system architecture of a communication network where examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station (BS) or eNB, which control a coverage area also referred to as a cell and with which a communication element or device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element like a UE or a communication network control element like an eNB besides those described in detail herein below.

Furthermore, the described network elements, such as communication elements like UEs, communication network control elements like BSs, eNBs, and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

As described above, it is one goal of communication network development to increase the available bandwidth for communications by making communication resources or frequency bands of other communication spectra, in particular of unlicensed spectrum like ISM, or WS spectrum, usable for the networks of a licensed spectrum, such as LTE, LTE-A the like based networks.

However, it has be found that one problem for using resources on an unlicensed spectrum, such as on frequency bands allocated to ISM, is that before configuring a SCell to a UE connected to a PCell controlled by a communication network control element like an eNB, the eNB has to know whether or not the concerned UE is in the coverage of the SCell to be configured. For example, in a communication network based on 3GPP LTE, the UE conducts an RRM measurement on any configured measurement object, but the measurement procedure is totally up to UE implementation. When considering, for example, that an irregular ON/OFF mechanism is implemented in the LTE based system with regard to communications on the unlicensed spectrum, it is not possible for the UE to detect e.g. a CRS during the OFF period, which impacts measurement accuracy and causes detection errors.

Another problem may arise from the fact that in communication networks, such as LTE based system, that inaccurate assumptions regarding a pathloss situation influence the overall performance, for example since transmission power setting is not accurate. For example, the UE is configured to use a measured DL pathloss also for settings related to UL pathloss, and performs then an open-loop power control. In systems based on TDD such an approach is not necessarily critical, because UL and DL communications use the same frequency and have same channel properties, and in systems based on e.g. FDD, even though UL and DL communication are on different carriers, the UL and DL carrier will be on same frequency band so a difference between the DL pathloss and UL pathloss is often neglectible. However, the situation is different when using, for example, communication resources from a WS spectrum. Here, the situation can be such that some channels are usable for DL communications only while other channels can be used for UL communication. Hence, the pathloss between UL and DL may be significantly different so that also the PL performance on such carriers will be different.

For example, when considering a configuration where one channel of a TV band allocated to a WS spectrum, such as TV channel 2 (54 MHz), is set as the DL carrier and another channel, such as channel 38 (614 MHz), is set as the UL carrier, wherein the configured DL carrier is used as a PL reference, then the PL difference between the UL carrier and the DL carrier in free space can be calculated by the following equation (1):

$$\Delta PL = PL_D - PL_U = 10 * \log 10\left(\frac{f_u^2}{f_d^2}\right) \approx 21 \text{ dB} \quad (1)$$

where $f_u$ and $f_d$ represent the frequencies of the UL and DL carriers, respectively, and $PL_D$ and $PL_U$ represent pathloss values for DL and UL, respectively.

As can be seen from the result of equation (1), in particular in lower frequency ranges, the PL difference between UL and DL carriers is high, i.e. around 100 times. Thus, using the DL pathloss as a reference for the UL pathloss (or the UL transmission power) would lead to an inaccurate configuration.

Figure 1:
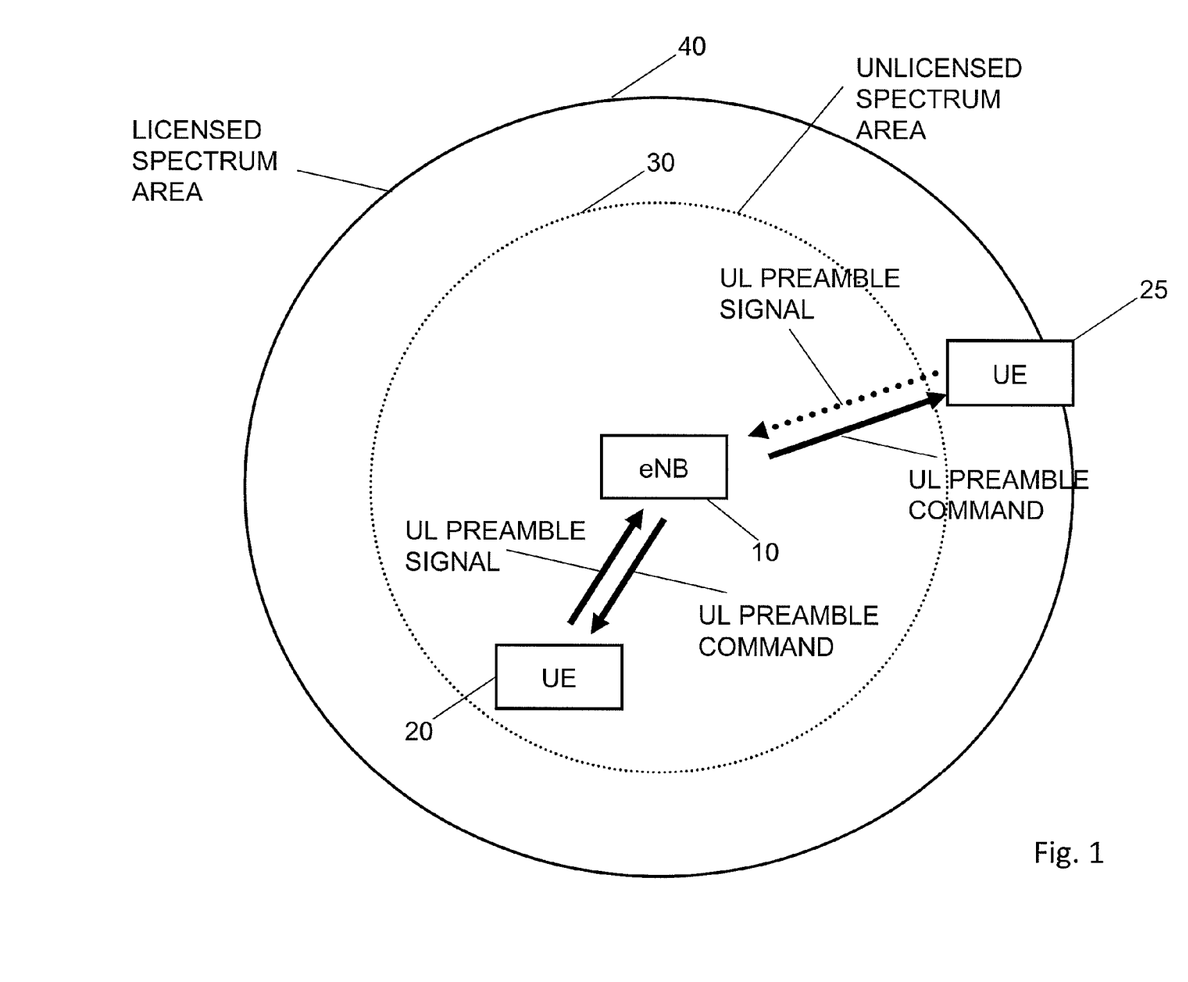
FIG. 1 shows a diagram illustrating a communication network structure in which examples of embodiments of the invention are applicable.

With regard to FIG. 1, a diagram illustrating a general configuration of a communication network is shown where examples of embodiments of the invention are applicable. It is to be noted that the structure indicated in FIG. 1 shows only those devices, network elements and parts which are useful for understanding principles underlying the examples of embodiments of the invention. As also known by those skilled in the art there may be several other network elements or devices involved in a connection between the communication element (UE) and the respective networks which are omitted here for the sake of simplicity.

In FIG. 1, reference sign 10 denotes a communication network control element such as an eNB or the like which is capable of communicating with different kinds of communication elements or devices, for example via carriers belonging to different frequency bands. The eNB 10 according to FIG. 1 is configured, for example, to control communications in a corresponding coverage area or cell and to conduct communications on communication resources belonging to a licensed spectrum, such as LTE, and on communication resources belonging to one or more other spectra, such as ISM (e.g. Bluetooth, WLAN) or WS (e.g. frequencies on TV spectrum or the like). The coverage areas of the respective communication spectra can be different to each other. For example, a coverage area or cell 40 for communication on the licensed spectrum may be greater than a coverage area or cell 30 for communication on the unlicensed spectrum. It is to be noted that a coverage area for communications using WS resources may be still different to areas 30 and 40 indicated in FIG. 1, for example.

Reference signs 20 and 25 denote a respective communication element such as a UE conducting a communication in the coverage areas or cells controlled by the eNB 10. According to FIG. 1, it is assumed that both UEs 20 and 25 are located within cell 40, but only UE 20 is also located in cell 30 (i.e. in range to the eNB 10 for conducting communication on the unlicensed spectrum, or the like). Furthermore, it is assumed that both UEs 20 and 25 are capable of communicating on unlicensed spectrum and/or WS spectrum, for example.

According to examples of embodiments of the invention, in case it is determined or decided at the communication network control side, e.g. by the eNB 10, that communication resources of a spectrum being different to the licensed spectrum (or different to a working unlicensed spectrum) are to be used e.g. for offloading traffic (or when the possibilities for offloading shall be evaluated, for example), i.e. when traffic to/from one or more UEs is to be offloaded on resources of an unlicensed spectrum, such as an ISM band or the like, the eNB 10 sends a specific signaling to one or more UEs (UEs 20 and 25 in FIG. 1) in its licensed spectrum coverage area 40 (indicated by the arrows in DL direction). It is to be noted that this specific signaling is sent, according to examples of embodiments of the invention, to specific UEs determined, for example, on the basis of a load condition and a required bandwidth of their communications, or according to other examples of the invention, it is broadcasted to all of the UEs in range, i.e. being within the coverage area of the eNB on the licensed spectrum.

The specific signaling, which is also referred to hereinafter as preamble transmission command or UL preamble command, is according to examples of embodiments of the invention, for example, one of a new defined MAC CE, a new defined PDCCH format, or a new defined measurement object-like RRC signaling. The preamble transmission command is sent to the UE(s) 20 and 25 in question by signaling on the licensed band (such as LTE signaling) and serves to trigger a receiving UE to send a preamble signal on another spectrum, such as via an unlicensed spectrum (ISM band) or WS spectrum.

For configuring the preamble signal transmission and making the preamble signal recognizable as being instructed by means of the preamble transmission command, the usage of certain resources (such as time and frequency based resources), wherein also a certain transmission power is set are indicated. According to examples of embodiments of the invention, this predetermined information regarding resources to be used for the transmission power is included in the new defined signaling. Alternatively, according to further examples of embodiments of the invention, preset settings stored in the receiving UEs, or settings provided by another entity are used for configuring the transmission of the preamble signal.

When the UEs 20 and 25 receive the preamble transmission command, a processing is triggered to prepare and send a preamble signal according to the instructions provided by the preamble transmission command, i.e. by using the predefined resources with a predefined interval and a predefined transmission power. This is indicated in FIG. 1 by the arrows in the UL direction labeled by UL preamble signal. In other words, based on an instruction received via the LTE signaling a preamble signal is transmitted on instructed resources of the unlicensed spectrum or WS spectrum, for example.

Depending on, for example, transmission conditions like interference, distance etc., the eNB 10 receives via a communication or signaling on the unlicensed or WS spectrum the preamble signal(s) triggered by the preamble transmission command from the UE(s) to which the preamble transmission command has been sent. As the preamble signal can be identified by the eNB 10 as being triggered by the command, e.g. due to the used resources or due to an ID given to the preamble signal, the eNB can decide which UE is under the coverage area of the unlicensed spectrum, e.g. in area 30. In the example shown in FIG. 1, even though both UEs 20 and 25 has sent the preamble signal towards the eNB 10, only the preamble signal of UE 20 is assumed to be received while that of UE 25 (indicated by the dashed arrow) is not received.

According to further examples of embodiments of the invention, the eNB 10 determines whether the UL and DL communications are conducted under comparable conditions, e.g. whether UL and DL carriers or channels are within a same frequency band. If this is not the case, as for example in case of using WS spectrum resources with different UL and DL allocated channels, which may cause a significant difference between a DL pathloss and an UL pathloss, the eNB 10 calculates on the basis of parameters derived from the predetermined resources allocated to be used for the transmission of the preamble signal and the actually received preamble signal of e.g. UE 20 an UL PL value. This UL PL value is then transmitted to the respective UE (here UE 20) in a specified signaling on the spectrum used also for the preamble transmission command, i.e. the licensed LTE spectrum, wherein the specified signaling uses according to examples of embodiments a new MAC CE or the like. This signaling of the calculated UL pathloss value is used by the UE 20 to decide on a transmission power or the like to be set for a communication via the unlicensed band using resources like those allocated to the preamble signaling.

It is to be noted that by means of the preamble transmission signal different modes of preamble transmission can be set. For example, according to examples of embodiments of the invention, an aperiodical signaling mode is set in which the preamble signal is sent only once or a predetermined number of times (repetition of transmission), in accordance with the setting instructed by parameters indicated in the preamble transmission command.

On the other hand, according to further examples of embodiments of the invention, a periodical transmission of the preamble signal is instructed. In this case, the eNB 10 sends the preamble transmission command on e.g. the licensed band wherein an instruction is included so as to configure the receiving UEs to periodically send the preamble signal on the indicated resources of the unlicensed spectrum, i.e. at certain resources with certain transmission power, and with a predetermined periodicity. This periodical transmission of the preamble signal is useful, for example, to achieve a faster CC tracing and coverage/PL estimation by the communication network control element, which allows the eNB 10, for example, to start immediately with an offloading of a UE's traffic to the unlicensed spectrum, if required, since it is not necessary to transmit first the preamble transmission command. A UE receiving the instruction to transmit the preamble signal with a certain periodicity operates, for example, in a non-LBT mode (non listen before talk/transmission mode) to enable periodical transmission.

Figure 2:
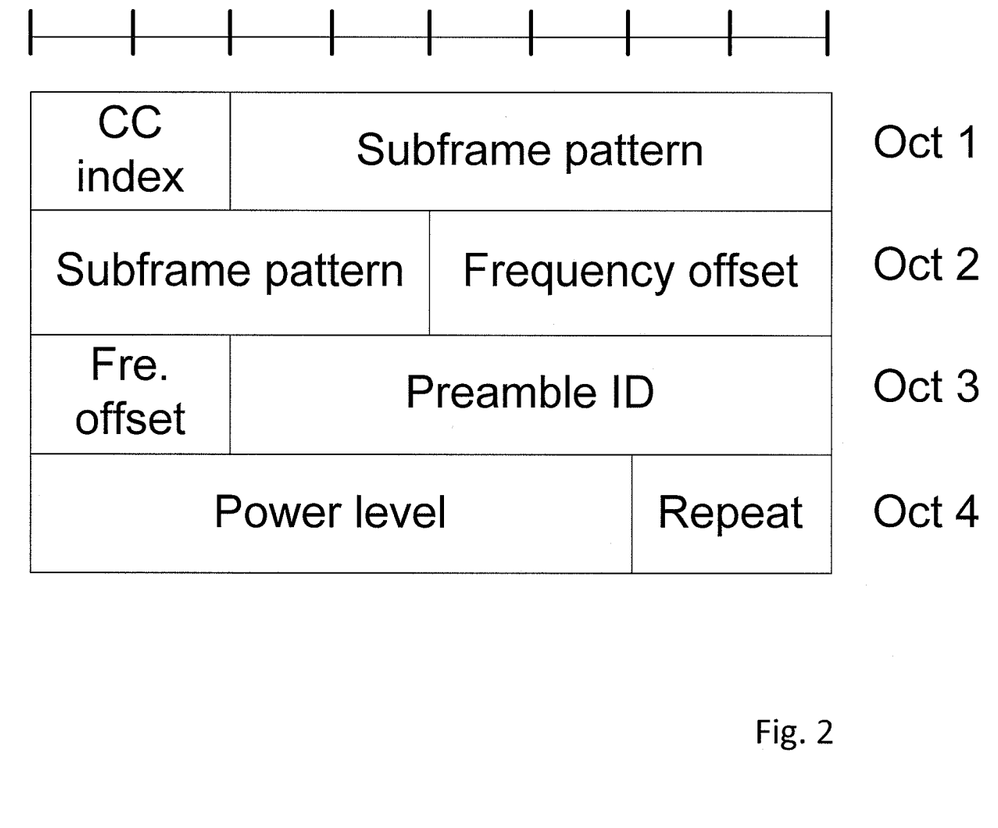
FIG. 2 shows a diagram illustrating a structure of a preamble transmission command according to examples of embodiments of the invention.

FIG. 2 shows a diagram illustrating the structure of a preamble transmission command according to examples of embodiments of the invention. The preamble transmission command includes different parameters for configuring the transmission of the preamble signal via the unlicensed band or the like. For example, the preamble transmission command comprises a preamble ID, a subframe pattern, a repetition interval, a transmission power level, a frequency offset, a CC index, etc. These parameters or information is included in the command signaling in a manner as shown in FIG. 2 where respective data fields are arranged in four octets Oct1 to Oct4, for example. It is to be noted that the example of FIG. 2 is only one of plural possible formats for the preamble transmission command.

Figure 3:
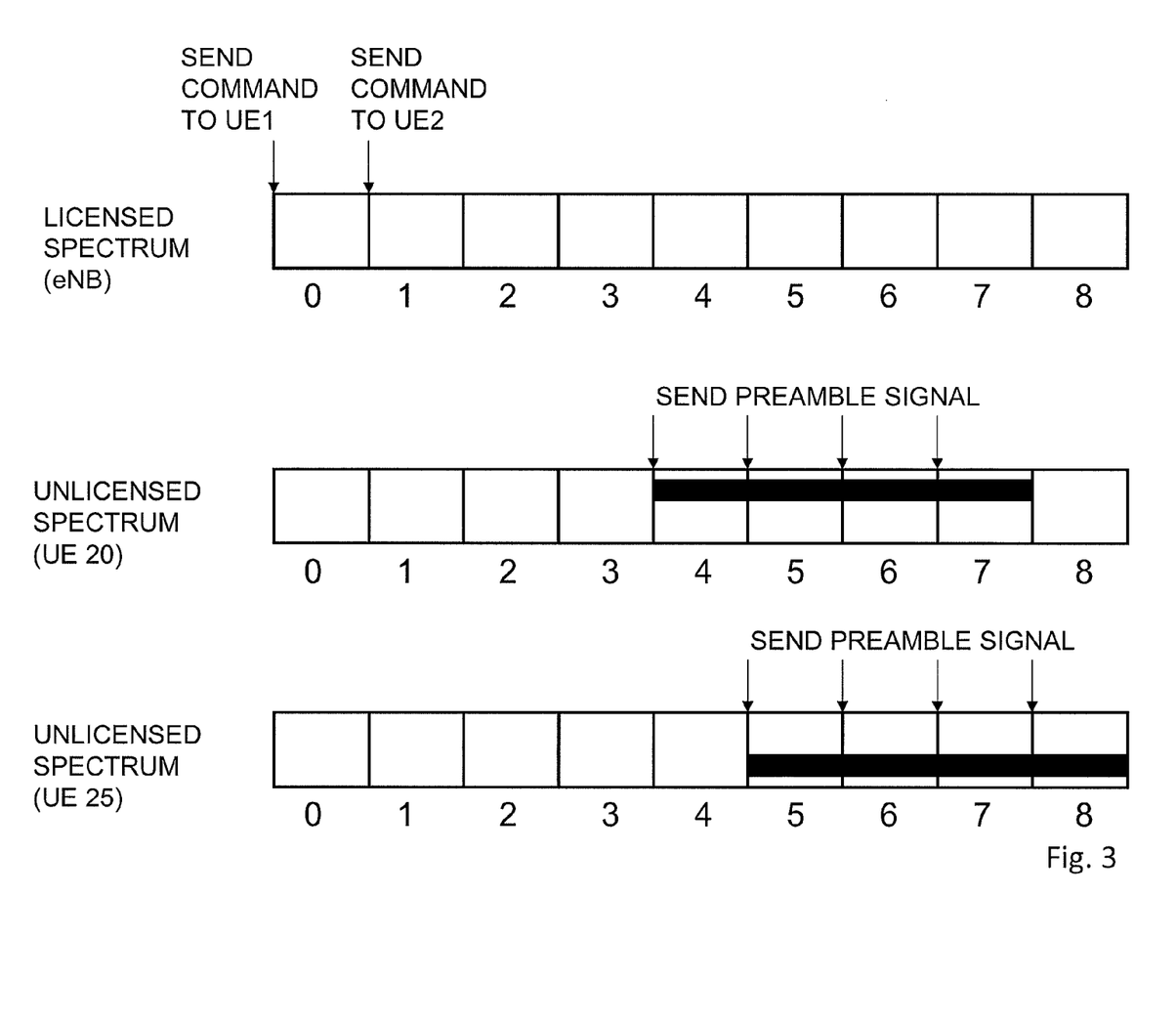
FIG. 3 shows a diagram illustrating transmission timing and frequencies of signals according to examples of embodiments of the invention.

On the basis of FIG. 3 which shows a diagram illustrating transmission timing and frequencies of signals according to examples of embodiments of the invention, the control mechanism using preamble transmission command and preamble signal as described above with regard to FIG. 1 will be further explained. FIG. 3 shows three subframe structures, one for the (DL) communication on the licensed spectrum for sending the preamble transmission command from the eNB 10 to the UEs, one for the (UL) communication on an unlicensed spectrum (e.g. ISM band, WiFi range) for sending the preamble signal towards the eNB 10 from UE 20, and one for the (UL) communication on an unlicensed spectrum (e.g. ISM band, WiFi range) for sending the preamble signal towards the eNB 10 from UE 25. The separation for the unlicensed bands is done only for the sake of clarity. In the subframe arrangements on the unlicensed spectrum, black strings illustrate different channels.

As described above, the mechanism using preamble transmission command signaling on a licensed spectrum and preamble signaling on an unlicensed spectrum, for example, is usable for determining a coverage of the communication network control element on the unlicensed (or WS etc.) spectrum as well as for determining an UL pathloss value, in particular when using different UL and DL channels.

According to examples of embodiments of the invention, the communication network control element (i.e. eNB 10) and communication elements in question (i.e. UEs 20 and 25) know a predefined channel mapping of resources on the unlicensed or WS spectrum, such as of ISM channels, and a corresponding CC index. For example, a mapping like WiFi channel 1 is corresponding to unlicensed CC index 0, WiFi channel 6 is corresponding to unlicensed CC index 1 and WiFi channel 11 is corresponding to unlicensed CC index 2, etc. may be predefined.

In case the eNB 10 decides to conduct traffic offloading for UE 20 from licensed spectrum to unlicensed spectrum, for example, on the ISM band, it sends preamble transmission command or UL probe command to UE 20 via a communication path on the licensed spectrum (LTE signaling) in which the UE 20 is instructed to send the preamble signal (i.e. an UL probe signal) having a specified ID (such as ID1) on WiFi channel 1 in subframes 4, 5, 6, 7 with 10 dBm (illustrated by the black bar in the subframes belonging to UE 20 communication). Furthermore, the eNB 10 decides to conduct traffic offloading for UE 25 from licensed to unlicensed spectrum, so that the eNB 10 sends a corresponding preamble transmission command (UL probe command) to UE 25 in which it is instructed to send a preamble signal (UL probe signal) with ID2 on WiFi channel 6 in subframes 5, 6, 7, 8, also with 10 dBm (illustrated by the black bar in the subframes belonging to UE 25 communication).

As described in connection with FIG. 1, it is assumed that the eNB 10 receives the preamble signal of UE 20, so that it is determined that UE 20 is in the eNB's ISM coverage area 30. Thus, the eNB 10 conducts a processing to activate a communication connection on this ISM channel and starts to off-load traffic for UE 20 on the unlicensed band.

On the other hand, as the eNB 10 does not receive the preamble signal of UE 25, it is determined that UE 25 is not able to conduct a communication on the spectrum part indicated in the preamble transmission command, for example since it is out of range (not in the coverage area 30) or since (unknown) interferences exist. Thus, according to examples of embodiments of the invention, the eNB 10 sends a new preamble transmission command or UL probe command to the non-answering UE 25 so as to instruct transmission of a new preamble signal or probe signal on another ISM band, WS band or the like, for example since there better communication conditions are assumed to exist.

According to examples of embodiments of the invention, the decision that the preamble signal is not received and a new preamble signal is to be instructed (i.e. a new preamble transmission command is to be issued) is made after a predefined timer expires, for example when the instructed subframes should have been arrived at the eNB 10.

In the following table 1, example values of logical channel IDs on DL shared channel are provided. The example illustrated in table 1 corresponds to LCID values used in a 3GPP based communication network. The index "11010" used for the UL probe command or preamble transmission command is included besides existing index values.

TABLE 1

Values of LCID for DL-SCH

| Index | LCID values |
|---|---|
| 00000 | CCCH |
| 00001-01010 | Identity of the logical channel |
| 01011-11001 | Reserved |
| 11010 | UL Probe Command |
| 11011 | Activation/Deactivation |
| 11100 | UE Contention Resolution Identity |

TABLE 1-continued

Values of LCID for DL-SCH

| Index | LCID values |
|---|---|
| 11101 | Timing Advance Command |
| 11110 | DRX Command |
| 11111 | Padding |

In case an UL PL value determination is required, e.g. since the UL and DL channels are provided by a WS spectrum and the UL and DL channels have different pathloss conditions, according to examples of embodiments of the invention, first a determination of the coverage i.e. whether the UE is in the corresponding coverage area or not and is able to conduct a communication on the WS spectrum or not is conducted, as described above. That is, a predefined channel mapping of WS channel and CC index is known to both eNB 10 and UE 20/25. Then, in case the eNB 10 decides to conduct an offload procedure of UE traffic on the WS spectrum, a corresponding UL probe command or preamble transmission command is sent to the UE 20 via licensed spectrum signaling, for example, to instruct transmission of preamble signal by UE 20 with ID1 on WS channel 21 in subframes 4, 5, 6, 7 with 10 dBm, and a corresponding UL probe command or preamble transmission command is sent to the UE 25 via licensed spectrum signaling, for example, to instruct transmission of preamble signal by UE 25 with ID2 on WS channel 45 in subframes 5, 6, 7, 8, also with 10 dBm.

Then, as the eNB 10 receives the preamble signal of UE 20, and it is thus determined that UE 20 is in the eNB's WS coverage area, the UL PL value is determined or calculated and a resulting UL PL value is sent to the UE 20 in a new defined UL PL MAC CE or the like by means of a signaling on the licensed spectrum.

Figure 4:
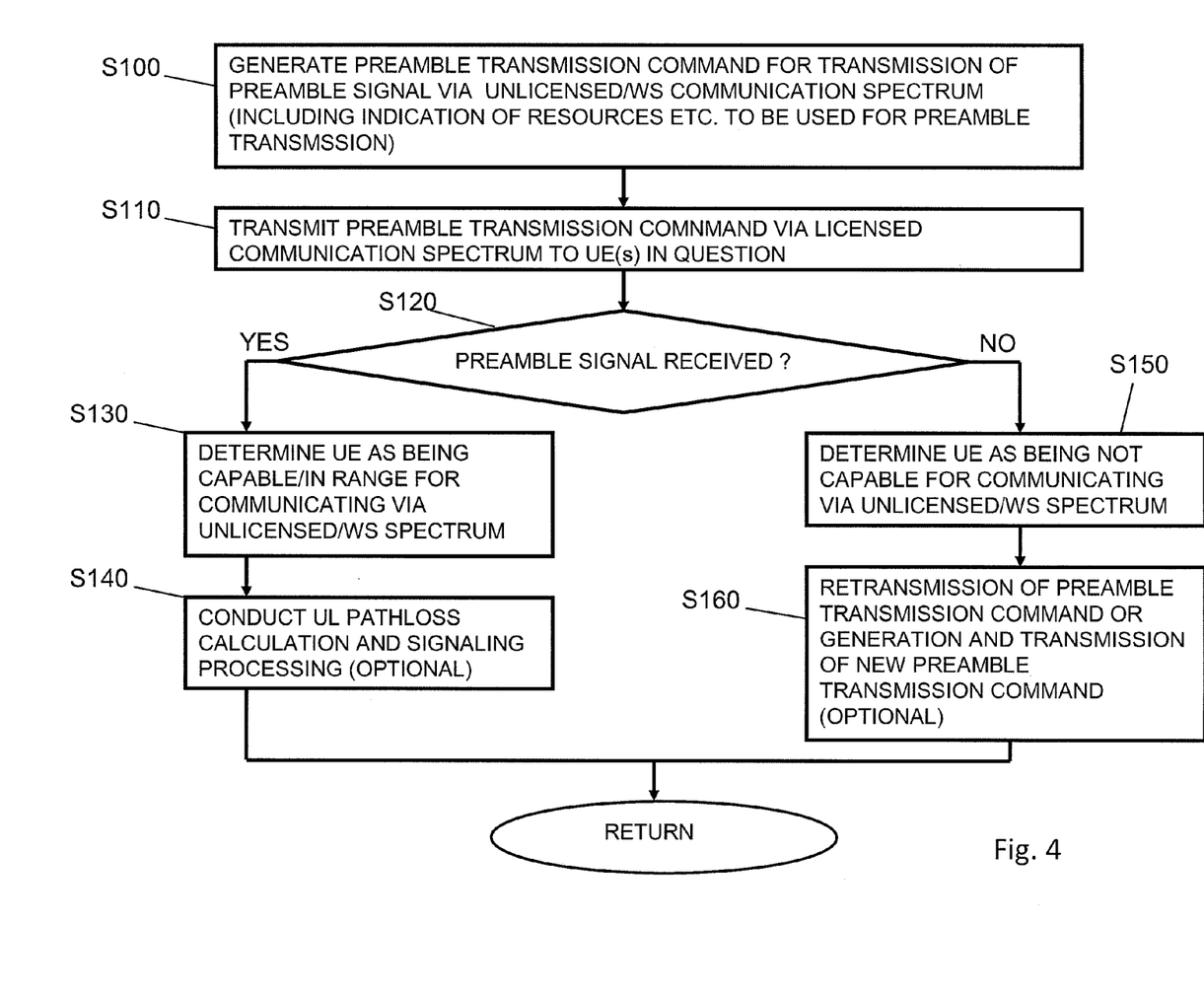
FIG. 4 shows flow chart illustrating a procedure conducted by a communication network control element according to examples of embodiments of the invention.

FIG. 4 shows a flow chart illustrating a procedure conducted by a communication network control element, such as an eNB 10 as shown in FIG. 1, according to examples of embodiments of the invention.

In step S100, a preamble transmission command is generated which comprises the instruction for causing transmission of a preamble signal on a first communication path.

That is, the preamble transmission command is generated such that it triggers at the recipient side (i.e. at the UEs 20 and 25 receiving the command) to transmit a preamble signal by using communication resources on e.g. an unlicensed spectrum or WS spectrum being indicated in the preamble transmission command. For this purpose, the preamble transmission command is generated, for example, in the form of e.g. a specific MAC CE, a control channel (PDCCH) format, or a measurement object-like RRC signaling content, wherein information related to the predetermined communication resources to be used for transmitting the preamble signal on the unlicensed or WS spectrum are also included. For example, the included information specifies an ID for the preamble signal, a subframe pattern of the preamble signal, a repetition interval for a transmission of the preamble signal (e.g. four times in consecutive subframes, as indicated in FIG. 2), a power level to be set for transmitting the preamble signal, a frequency offset for the preamble signal, and a CC index for the preamble signal. Alternatively or additionally, according to examples of embodiments of the invention, an instruction or indication is included in the signaling of the preamble transmission command that the preamble signal is to be sent by the UEs aperiodically, i.e. only for one or several times, or that a periodical signaling is to be set by the UE(s) for continuously sending the preamble signal.

In step S110, the preamble transmission command generated in step S100 is sent to the UEs on the communication path using the licensed spectrum, i.e. via cellular LTE communication signaling.

In step S120, it is detected whether the preamble signal being instructed by the previously sent preamble transmission command is received on the unlicensed or WS spectrum. In other words, it is decided whether and which of the corresponding UEs instructed to send the preamble signals can be received at the eNB 10. The decision of whether or not the preamble signal is received is based, according to further examples of embodiments of the invention, for example on a timer or the like indicating a time period starting at the transmission of the preamble transmission command until which the preamble signal has to be received (this is implemented, for example, in case an aperiodical signaling of the preamble is instructed).

In case the corresponding preamble signal is received (YES in step S120), such as with regard to UE 20 according to FIG. 1, the UE sending the preamble signal is determined in step S130 to be capable of conducting a communication on the unlicensed or WS spectrum (e.g. to be in range to the eNB 10 for such a communication), so that preparation of activating or establishing a corresponding communication on this communication spectrum can be made, for example for off-loading purpose or the like.

In addition, according to examples of embodiments of the invention, as a further optional processing, in step S140, the received preamble signal is used for calculating an UL pathloss between the UE 20 and the eNB 10. This step S140 is conducted, for example, in case UL and IX communications are conducted on different communication bands. The thus calculated UL pathloss value is signaled in a suitable form to the UE 20, for example in the form of a MAC CE or the like via the licensed communication path.

On the other hand, in case the corresponding preamble signal is not received (NO in step S120), such as with regard to UE 25 according to FIG. 1, the UE to which the preamble transmission command is sent in step S110 is determined in step S150 to be not capable of conducting a communication on the unlicensed or WS spectrum (e.g. to be not in range to the eNB 10 for such a communication).

According to examples of embodiments of the invention, as an optional processing, the eNB 10 is configured to conduct at least one of the following processes. As a first possibility, the preamble transmission command sent in preceding step S110 is re-transmitted, i.e. the preamble transmission command with basically the same communication resource information etc. is sent to the UE(s) so as to trigger the transmission of the preamble signal under the same condition as in the preceding transmission. By means of this procedure, for example, temporary interferences or a decrease in the distance to the eNB due to a movement of the UE could be considered. As a second possibility, which could be also conducted in addition to the first possibility of re-transmitting the "old" preamble transmission command, the process is returned to step S100 where a new preamble transmission command for causing transmission of a preamble signal is generated and send to the UE(s) in a following step according to S110. In this second possibility, when generating a new preamble transmission command, also (at least partly) different communication resource information is included for instructing usage of predetermined communication resources for transmitting the (new) preamble signal on the first communication path so as to change the transmission conditions and increase the chance to receive the preamble signal (e.g. by increasing a transmit power, changing a frequency range, or the like). Alternatively or additionally, according to examples of embodiments of the invention, in the second possibility of generating a new preamble transmission signal, also a change of the communication path from the first path to a third path is considered. That is, instead of using for example ISM band resources for transmitting the preamble signal (and thus for establishing a communication connection for e.g. offloading purpose), a change to a WS communication resource or the like is conducted. The new preamble transmission command is then send to the UEs in a step corresponding to step S110. In other words, the (optional) step S160 provides a return to either S100 or S110 (according to the possibility or retransmission or new transmission to be selected).

As a further alternative, after step S150 and instead of step S160, according to further examples of embodiments of the invention, it is decided to stop communication attempts with the corresponding UE via the unlicensed or WS spectrum.

Figure 5:
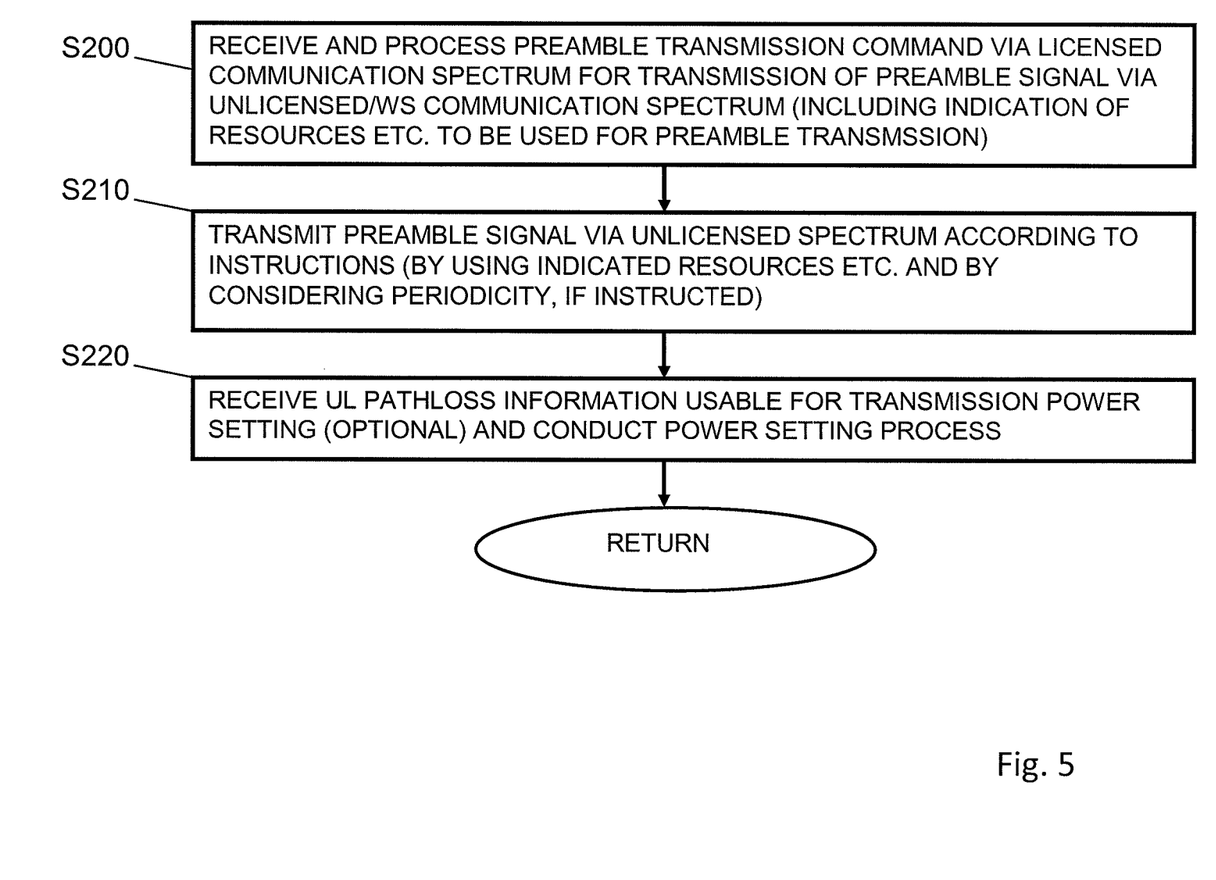
FIG. 5 shows flow chart illustrating a procedure conducted by a communication element according to examples of embodiments of the invention.

FIG. 5 shows a flow chart illustrating a procedure conducted by a communication element, such as UE 20 as shown in FIG. 1, according to examples of embodiments of the invention.

In step S200, a preamble transmission command is received and processed in the UE 20. The preamble transmission command is received via a communication path on e.g. the licensed communication spectrum, for example by LTE based signaling, and corresponds to that transmitted in step S110 according to FIG. 4. The preamble transmission command comprises an instruction for causing a transmission of a preamble signal on another communication path, such as a path using unlicensed communication spectrum or WS spectrum resources.

For example, the preamble transmission command is received in the form of e.g. a specific MAC CE, a control channel (PDCCH) format, or a measurement object-like RRC signaling content, wherein information related to predetermined communication resources to be used for transmitting the preamble signal on the unlicensed or WS spectrum are included. For example, the included information specifies an ID for the preamble signal, a subframe pattern of the preamble signal, a repetition interval for a transmission of the preamble signal (e.g. four times in consecutive subframes, as indicated in FIG. 2), a power level to be set for transmitting the preamble signal, a frequency offset for the preamble signal, and a CC index for the preamble signal. Alternatively or additionally, according to examples of embodiments of the invention, an instruction or indication is included in the signaling of the preamble transmission command that the preamble signal is to be sent aperiodically, i.e. only for one or several times, or that a periodical signaling is to be set for continuously sending the preamble signal.

In step S210, the UE 20 sends a preamble signal according to the instructions given by the preamble transmission command, i.e. by using the communication resources on the communication path derived from the information in the command, for example on ISM band or WS band. Furthermore, periodicity setting of the signaling is considered, i.e. periodical or aperiodical signaling of the preamble signal.

In step S220, according to examples of embodiments of the invention, as a further optional processing being a counterpart to step S140 according to FIG. 4, for example, the UE 20 receives (in response to the preamble signal) information indicating an UL pathloss between the UE 20 and the eNB 10. This information is provided, for example, in case UL and DL communications are conducted on different communication bands. The received UL pathloss value is received, for example, in form of a MAC CE or the like via the licensed communication path, i.e. in an LTE based signaling. On the basis of the UL pathloss value, the UE 20 conducts a configuration of a communication on the first communication path, i.e. the unlicensed or WS spectrum, for example by setting a transmission power on the basis of the received UL pathloss value.

It is to be noted that UE 25 according to FIG. 1 conducts basically the same processing, but without step S220 as no pathloss information can be sent from the eNB 10.

Figure 6:
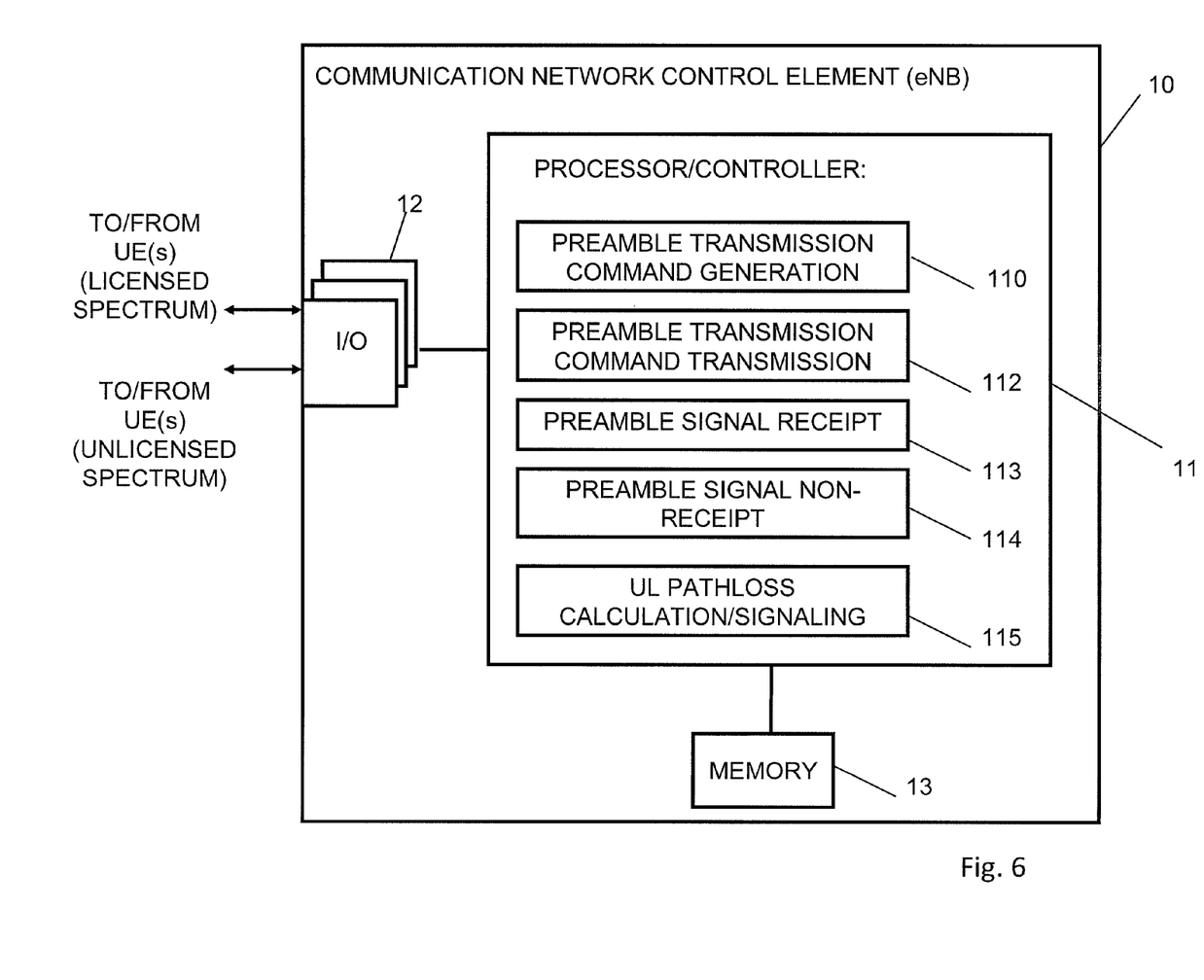
FIG. 6 shows a block circuit diagram of a communication network control element including processing portions conducting functions according to examples of embodiments of the invention.

In FIG. 6, a block circuit diagram illustrating a circuitry indicating a configuration of a communication network control element, such as the eNB 10, is shown, which is configured to implement the processing for controlling communications as described in connection with the examples of embodiments of the invention. That is, a circuitry is shown which comprises at least one processor and at least one memory including computer program code, the at least one memory and the computer program code being configured to, with the at least one processor, cause the eNB 10 to perform functions as described below, for example by executing a corresponding algorithm. It is to be noted that the communication network control element or eNB 10 shown in FIG. 6 may comprise several further elements or functions besides those described herein below, which are omitted herein for the sake of simplicity as they are not essential for understanding the invention. Furthermore, even though reference is made to an eNB, the communication network control element may be also another device having a similar function, such as a server, a base station etc., or have a form like a modem chipset, a chip, a module etc., which can also be part of a network element such as an eNB or attached as a separate element to an eNB, or the like.

The communication network control element or eNB 10 may comprise a processing function or processor 11, such as a CPU or the like, which executes instructions given by programs or the like related to the control signal transmission control. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denotes transceiver or input/output (I/O) units connected to the processor 11. The I/O units 12 may be used for communicating with one or more communication elements like UE 20, 25 by using different communication paths, such as licensed and unlicensed communication spectra. The I/O unit 12 may be a combined unit comprising communication equipment towards several elements, or may comprise a distributed structure with a plurality of different interfaces for different network elements. Reference sign 13 denotes a memory usable, for example, for storing data and programs to be executed by the processor 11 and/or as a working storage of the processor 11.

The processor 11 is configured to execute processing related to the above described mechanism for controlling communications. In particular, the processor 11 comprises a sub-portion 111 as a processing portion which is usable for generating a preamble transmission command. The portion 111 may be configured to perform processing according to step S100 according to FIG. 4, for example. Furthermore, the processor 11 comprises a sub-portion 112 usable as a portion for causing transmission of the preamble transmission command, e.g. via I/O units 12. The portion 112 may be configured to perform processing according to step S110 according to FIG. 4, for example. In addition, the processor 11 comprises a sub-portion 113 as a processing portion which is usable for detecting a receipt of the preamble signal. Furthermore, the processor 11 comprises a sub-portion 114 as a processing portion which is usable for detecting that the preamble signal is not received. The portion 113 may be configured to perform processing according to steps S120 and S130 according to FIG. 4, while the portion 114 may be configured to perform steps S120, S150 and S160 according to FIG. 4, for example. In addition, the processor 11 comprises a sub-portion 115 usable as a portion for calculating and signaling an UL pathloss on the basis of the received preamble signal. The portion 115 may be configured to perform processing according to step S140 according to FIG. 4, for example.

Figure 7:
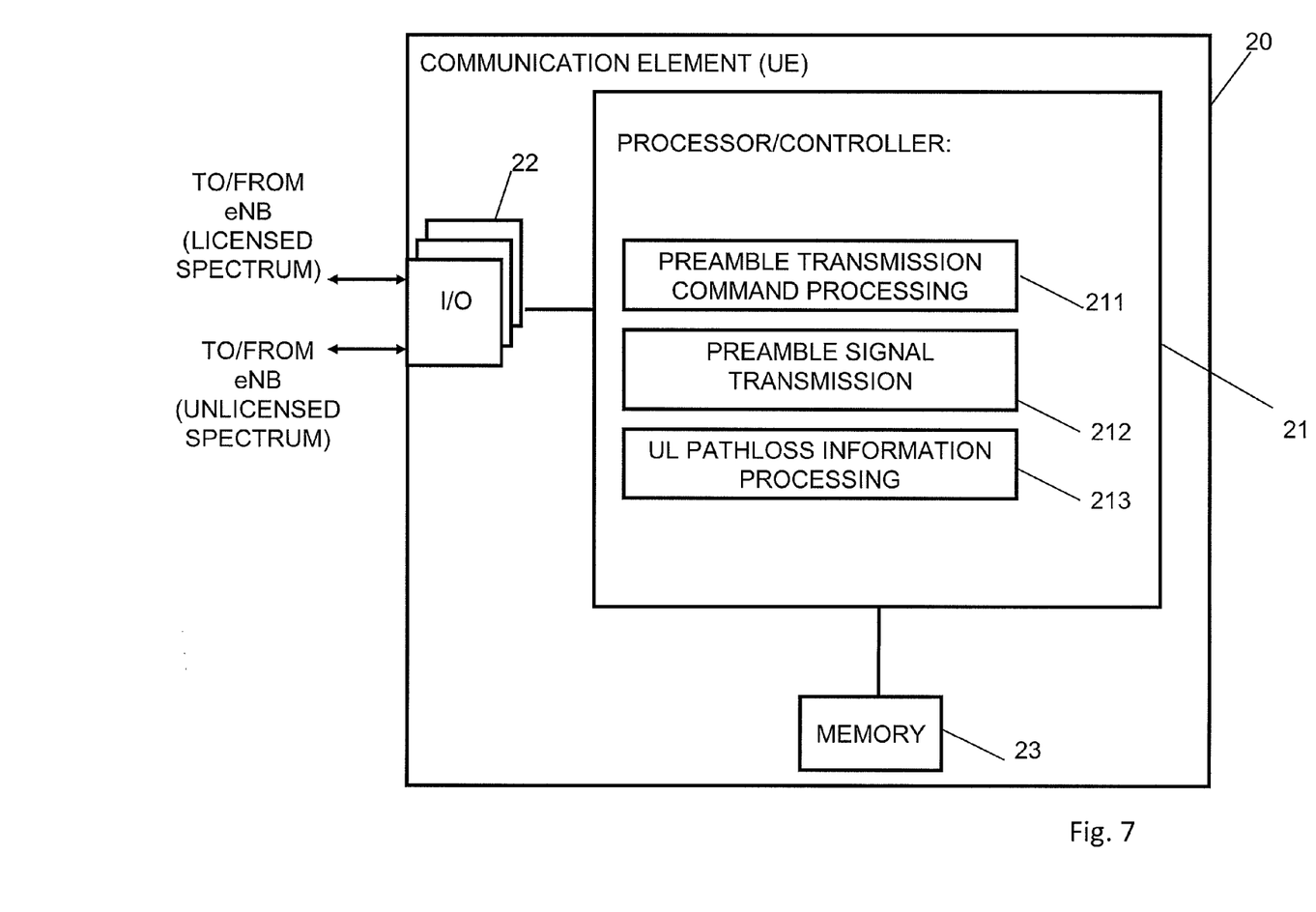
FIG. 7 shows a block circuit diagram of a communication element including processing portions conducting functions according to examples of embodiments of the invention.

In FIG. 7, a block circuit diagram illustrating a circuitry indicating a configuration of a communication element, such as the UE 20, is shown, which is configured to implement the processing for controlling communications as described in connection with the examples of embodiments of the invention. That is, a circuitry is shown which comprises at least one processor and at least one memory including computer program code, the at least one memory and the computer program code being configured to, with the at least one processor, cause the UE 20 to perform functions as described below, for example by executing a corresponding algorithm. It is to be noted that the communication element or UE 20 shown in FIG. 7 may comprise several further elements or functions besides those described herein below, which are omitted herein for the sake of simplicity as they are not essential for understanding the invention. Furthermore, even though reference is made to an UE, the communication element may be also another device having a similar function, such as a modem chipset, a chip, a module etc., which can also be part of a communication element such as an UE or attached as a separate element to an UE, or the like.

The communication element or UE 20 may comprise a processing function or processor 21, such as a CPU or the like, which executes instructions given by programs or the like related to the control signal transmission control. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes transceiver or input/output (I/O) units connected to the processor 21. The I/O units 22 may be used for communicating with a communication network control element like the eNB 10 by using different communication paths, such as licensed and unlicensed communication spectra. The I/O unit 22 may be a combined unit comprising communication equipment towards several elements, or may comprise a distributed structure with a plurality of different interfaces for different network elements. Reference sign 23 denotes a memory usable, for example, for storing data and programs to be executed by the processor 21 and/or as a working storage of the processor 21.

The processor 21 is configured to execute processing related to the above described mechanism for controlling communications. In particular, the processor 21 comprises a sub-portion 211 as a processing portion which is usable for receiving and processing a preamble transmission command. The portion 211 may be configured to perform processing according to step S200 according to FIG. 5, for example. Furthermore, the processor 21 comprises a sub-portion 212 usable as a portion for causing transmission of the preamble signal, e.g. via I/O units 22. The portion 212 may be configured to perform processing according to step S210 according to FIG. 5, for example. In addition, the processor 21 comprises a sub-portion 213 as a processing portion which is usable for receiving and processing UL pathloss information. The portion 213 may be configured to perform processing according to step S220 according to FIG. 5, for example.

As described above, examples of embodiments of the invention are described to be implemented in UEs and eNBs. However, the invention is not limited to this. For example, examples of embodiments of the invention may be implemented in a wireless modem or the like.

Furthermore, it is to be noted that in the above described examples of embodiments of the invention the communication path via which the preamble transmission command is sent to the UEs (also referred to as second communication path) is described to be on the licensed communication spectrum, such as LTE based signaling. According to further examples of embodiments of the invention, also communication paths on other spectrum parts than the licensed spectrum are usable for transmitting the preamble transmission command or the UL PL value related information, for example a communication path on an unlicensed spectrum or WS spectrum which is already used in a communication connection between the communication network control element like the eNB 10 and the respective UE (e.g. UE 20), such as an established or working WLAN connection, Bluetooth connection, or the like. Accordingly, according to examples of embodiments of the invention, the reason for establishing a communication connection on the first communication path, such as an offloading of traffic, is caused by the communication situation on the other established or working communication connection, such as the working WLAN connection.

According to further examples of embodiments of the invention, there is provided an apparatus comprising preamble transmission command processing means for generating a preamble transmission command comprising instruction for causing transmission of a preamble signal on a first communication path, and for causing transmission of the preamble transmission command on a second communication path being different to the first communication path, and preamble signal detecting means for detecting whether the preamble signal instructed by the preamble transmission command is received via the first communication path.

Furthermore, according to examples of embodiments of the invention, there is provided an apparatus comprising preamble transmission command receiving means for receiving and processing a preamble transmission command comprising instruction for causing transmission of a preamble signal on a first communication path, wherein the preamble transmission command is received via a second communication path being different to the first communication path, and preamble signal transmitting means for causing transmitting of a preamble signal via the first communication path according to the instruction of the preamble transmission command.

Moreover, according to further examples of embodiments of the invention, there is provided an apparatus comprising at least one processor; and at least one memory including computer program code; the at least one memory and the computer program code configured to, with the at least one processor, cause the apparatus at least to perform a preamble transmission command processing function configured to generate a preamble transmission command comprising instruction for causing transmission of a preamble signal on a first communication path, and to cause transmission of the preamble transmission command on a second communication path being different to the first communication path, and a preamble signal detecting function configured to detect whether the preamble signal instructed by the preamble transmission command is received via the first communication path.

Moreover, according to further examples of embodiments of the invention, there is provided an apparatus comprising at least one processor; and at least one memory including computer program code; the at least one memory and the computer program code configured to, with the at least one processor, cause the apparatus at least to perform a preamble transmission command receiving function configured to receive and process a preamble transmission command comprising instruction for causing transmission of a preamble signal on a first communication path, wherein the preamble transmission command is received via a second communication path being different to the first communication path, and a preamble signal transmitting function configured to cause transmitting of a preamble signal via the first communication path according to the instruction of the preamble transmission command.

For the purpose of the present invention as described herein above, it should be noted that

- an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable communication networks and transmission nodes may be or comprise any device, apparatus, unit or means by which a station, entity or other user equipment may connect to and/or utilize services offered by the access network; such services include, among others, data and/or (audio-) visual communication, data download etc.;
- a user equipment or communication network element may be any device, apparatus, unit or means which is usable as a user communication device and by which a system user or subscriber may experience services from an access network, such as a mobile phone, a wireless mobile terminal, a personal digital assistant PDA, a smart phone, a personal computer (PC), a laptop computer, a desktop computer or a device having a corresponding functionality, such as a modem chipset, a chip, a module etc., which can also be part of a UE or attached as a separate element to a UE, or the like, wherein corresponding devices or terminals may be, for example, an LTE, an LTE-A, a TETRA (Terrestrial Trunked Radio), an UMTS, a GSM/EDGE etc. smart mobile terminal or the like;
- method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
- devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described,
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

Furthermore, as used in this application, the terms 'device' or 'circuitry' refer to all of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory (or memories) working together to cause an apparatus, such as a mobile phone or server, to perform various functions) and (c) circuits, such as a microprocessor (or plural microprocessors) or a portion of a microprocessor (or plural microprocessors), that requires/require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device As described above, there is provided a mechanism for controlling communications conducted via different frequency bands or communication spectrums. When a communication via a first communication path, for example an unlicensed or white space communication spectrum, is to be established, e.g. for offloading traffic from a second communication path, for example a licensed cellular communication spectrum, a preamble transmission command is generated and transmitted from a communication network control element, such as an eNB, via the second communication path to a communication element, such as a UE. By means of the preamble transmission command, the transmission of a preamble signal by the receiving communication element on the first communication path with predetermined communication resources is triggered. Based on a receipt or non-receipt of the preamble signal via the first communication path, the communication network control element is able to determine that the communication element can establish a connection on the first communication path, for example the unlicensed or white space communication spectrum.

Although the present invention has been described herein before with reference to particular embodiments thereof, the present invention is not limited thereto and various modifications can be made thereto.

What is claimed is:

1. An apparatus comprising:
   circuitry configured to
      generate a preamble transmission command comprising instruction for causing transmission of a preamble signal on a first communication path, and to cause transmission of the preamble transmission command on a second communication path being different to the first communication path; and
      detect whether the preamble signal instructed by the preamble transmission command is received via the first communication path within a predetermined period of time after the preamble transmission command is transmitted.

2. The apparatus of claim 1, wherein
the first communication path belongs to at least one of an unlicensed communication spectrum or a white-space communication spectrum, and
the second communication path belongs to a licensed communication spectrum or working unlicensed spectrum.

3. The apparatus of claim 1, wherein
the circuitry is configured to generate the preamble transmission command in the form of one of a control element, a control channel format, or a radio resource control signal.

4. The apparatus of claim 1, wherein
the circuitry is configured to introduce in the preamble transmission command information related to predetermined communication resources to be used for transmitting the preamble signal on the first communication path, wherein the information specifies at least one of an identification to be used for the preamble signal, a subframe pattern of the preamble signal, a repetition interval for a transmission of the preamble signal, a power level to be set for transmitting the preamble signal, a frequency offset for the preamble signal, and a component carrier index for the preamble signal.

5. The apparatus of claim 1, wherein
the circuitry is configured, when the preamble signal instructed by the preamble transmission command is received via the first communication path, to determine that a recipient of the preamble transmission command is capable of communicating on the second communication path, and to cause preparing of an activation of a communication connection with the recipient of the preamble transmission command via the first communication path.

6. The apparatus of claim 1, wherein
the circuitry is configured to calculate, on the basis of a preamble signal instructed by the preamble transmission command and received via the first communication path, an uplink pathloss value of a communication, and to cause transmitting of pathloss information to a recipient of the preamble transmission command instructing the received preamble signal, the pathloss information indicating the calculated uplink pathloss.

7. The apparatus of claim 1, wherein the circuitry is configured, when the preamble signal instructed by the preamble transmission command is not received, to conduct at least one of
   causing the preamble transmission command processing portion to cause re-transmitting of the preamble transmission command, or
   causing the preamble transmission command processing portion to generate and transmit a new preamble transmission command for causing transmission of a preamble signal, wherein
   the new preamble transmission command comprises information related to predetermined communication resources to be used for transmitting the preamble signal on the first communication path, the predetermined communication resources being different to communication resources to be used for transmitting the preamble signal being not received, or information related to predetermined communication resources to be used for transmitting the preamble signal on a third communication path being different to the first and second communication paths.

8. The apparatus of claim 1, wherein
the apparatus is comprised in an evolved node B of an LTE or LTE-A based cellular communication network, and
the preamble transmission command is transmitted to a communication element being controlled by the communication network control element.

9. An apparatus
circuitry configured to
   generate a preamble transmission command comprising instruction for causing transmission of a preamble signal on a first communication path, and to cause transmission of the preamble transmission command on a second communication path being different to the first communication path;
   introduce in the preamble transmission command an indication for one of an aperiodical signaling of the preamble signal or a periodical signaling of the preamble signal; and detect whether the preamble signal instructed by the preamble transmission command is received via the first communication path.

10. A method comprising
generating a preamble transmission command comprising instruction for causing transmission of a preamble signal on a first communication path;
transmitting the preamble transmission command on a second communication path being different to the first communication path; and
detecting whether the preamble signal instructed by the preamble transmission command is received via the first communication path within a predetermined period of time after the preamble transmission command is transmitted.

11. The method according to claim 10, wherein the first communication path belongs to at least one of an unlicensed communication spectrum or a white-space communication spectrum, and the second communication path belongs to a licensed communication spectrum or working unlicensed spectrum.

12. The method according to claim 10, further comprising introducing, in the preamble transmission command, information related to predetermined communication resources to be used for transmitting the preamble signal on the first communication path, wherein the information specifies at least one of an identification to be used for the preamble signal, a subframe pattern of the preamble signal, a repetition interval for a transmission of the preamble signal, a power level to be set for transmitting the preamble signal, a frequency offset for the preamble signal, and a component carrier index for the preamble signal.

13. An apparatus comprising:
circuitry configured to
receive and process a preamble transmission command comprising instruction for causing transmission of a preamble signal on a first communication path, wherein the preamble transmission command is received via a second communication path being different to the first communication path and indicates one of an aperiodical signaling of the preamble signal or a periodical signaling of the preamble signal; and
cause transmitting of a preamble signal aperiodically or periodically according to the indication via the first communication path according to the instruction of the preamble transmission command.

14. The apparatus of claim 13, wherein
the first communication path belongs to at least one of an unlicensed communication spectrum or a white-space communication spectrum, and
the second communication path belongs to a licensed communication spectrum or working unlicensed spectrum.

15. The apparatus of claim 13, wherein
the circuitry is configured to receive the preamble transmission command in the form of one of a control element, a control channel format, or a radio resource control signal.

16. The apparatus of claim 13, wherein
the circuitry is configured to achieve from the preamble transmission command information related to predetermined communication resources to be used for transmitting the preamble signal on the first communication path, wherein
the information specifies at least one of an identification to be used for the preamble signal, a subframe pattern of the preamble signal, a repetition interval for a transmission of the preamble signal, a power level to be set for transmitting the preamble signal, a frequency offset for the preamble signal, and a component carrier index for the preamble signal.

17. The apparatus of claim 13, wherein the circuitry is configured to
receive and process a pathloss information indicating an uplink pathloss value of a communication via the first communication path; and
set a transmission power for a communication via the first communication path on the basis of the received uplink pathloss value.

18. The apparatus of claim 13, wherein
the apparatus is comprised in a communication element located in an LTE or LTE-A based cellular communication network, and
the preamble transmission command is received from an evolved node B of the LTE or LTE-A based cellular communication network, controlling the communication element.

* * * * *